(12) United States Patent
Kuramoto

(10) Patent No.: US 9,115,971 B2
(45) Date of Patent: Aug. 25, 2015

(54) MEASURING APPARATUS

(75) Inventor: Yoshiyuki Kuramoto, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 267 days.

(21) Appl. No.: 13/615,972

(22) Filed: Sep. 14, 2012

(65) Prior Publication Data

US 2013/0063728 A1 Mar. 14, 2013

(30) Foreign Application Priority Data

Sep. 14, 2011 (JP) .................................. 2011-200097

(51) Int. Cl.
*G01B 9/02* (2006.01)
*G01B 11/24* (2006.01)

(52) U.S. Cl.
CPC ........ *G01B 9/02008* (2013.01); *G01B 9/02002* (2013.01); *G01B 9/0209* (2013.01); *G01B 9/02014* (2013.01); *G01B 9/02065* (2013.01); *G01B 9/02069* (2013.01); *G01B 11/2441* (2013.01); *G01B 2290/60* (2013.01); *G01B 2290/70* (2013.01)

(58) Field of Classification Search
CPC ............. G01B 9/0209; G01B 9/02008; G01B 9/02083
USPC ....................................................... 356/484
See application file for complete search history.

(56) References Cited

U.S. PATENT DOCUMENTS

| 6,493,091 B2 | 12/2002 | Korogi et al. |
| 7,483,143 B2 * | 1/2009 | Sanders et al. ................ 356/454 |
| 2008/0097709 A1 * | 4/2008 | de Boer et al. .................. 702/66 |
| 2010/0110444 A1 * | 5/2010 | Kuramoto ..................... 356/498 |
| 2010/0225924 A1 * | 9/2010 | Kuramoto ..................... 356/487 |
| 2011/0292399 A1 * | 12/2011 | Alphonse ..................... 356/479 |

FOREIGN PATENT DOCUMENTS

| JP | 04084704 A | 3/1992 |
| JP | 2002082045 A | 3/2002 |
| JP | 3739987 B2 | 1/2006 |
| JP | 4554385 B2 | 9/2010 |
| JP | 2010261776 A | 11/2010 |

* cited by examiner

*Primary Examiner* — Jonathan Hansen
(74) *Attorney, Agent, or Firm* — Rossi, Kimms & McDowell LLP

(57) ABSTRACT

A measuring apparatus includes an optical frequency comb source configured to emit an optical frequency comb in which a plurality of frequency components are arranged at equal frequency intervals, a beam splitter configured to split a beam emitted from the optical frequency comb source into a test beam to be irradiated onto a test surface and a reference beam to be irradiated onto a reference surface, an optical path difference changing element configured to change an optical path difference between the reference beam and the test beam, an image sensor configured to capture an interference pattern formed by interference between the test beam and the reference beam, and an analyzer configured to calculate a position of the test surface based upon a signal of the interference pattern captured while the optical path length difference is being changed by the optical path difference changing element.

6 Claims, 5 Drawing Sheets

MEASURING APPARATUS

BACKGROUND OF THE INVENTION

1. Field of the Invention

The present invention relates to a measuring apparatus configured to measure a position of a test surface.

2. Description of the Related Art

Japanese Patent No. ("JP") 4,554,385 proposes a white light interferometer configured to separate scanning of a test surface position into a wide-range measuring interval and a micro measuring interval, and to provide scanning with the micro measuring intervals for each wide-range measuring interval. JP 3,739,987 proposes an optical frequency comb interferometer configured to measure a test surface position without scanning a test or reference surface by utilizing an optical frequency comb for test and reference beams and by setting different frequency intervals.

However, the white light interferometer disclosed in JP 4,554,385 requires $10^5$ image pickups or more for a measurement range of 100 mm even if the wide-range measuring interval is set to about several micro millimeters and thus is impractical due to enormous measurement times and a long measurement time period. The optical frequency comb interferometer disclosed in JP 3,739,987 utilizes two optical frequency comb sources and causes the measuring apparatus to be expensive. In addition, the measuring accuracy is limited due to the relative phase noises between these two optical light sources. Moreover, since the optical frequency comb interferometer disclosed in JP 3,739,987 condenses the test beam upon the test surface and measures the position of the test surface, scanning a spot position is necessary to measure the shape of the test surface and thus the measurement takes a long time.

SUMMARY OF THE INVENTION

The present invention provides a measuring apparatus configured to quickly and precisely measure a shape of a test surface.

A measuring apparatus according to the present invention includes an optical frequency comb source configured to emit an optical frequency comb in which a plurality of frequency components are arranged at equal frequency intervals, a beam splitter configured to split a beam emitted from the optical frequency comb source into a test beam to be irradiated onto a test surface and a reference beam to be irradiated onto a reference surface, an optical path difference changing element configured to change an optical path difference between the reference beam and the test beam, an image sensor configured to capture an interference pattern formed by interference between the test beam and the reference beam, and an analyzer configured to calculate a position of the test surface based upon a signal of the interference pattern captured while the optical path length difference is being changed by the optical path difference changing element.

Further features of the present invention will become apparent from the following description of exemplary embodiments with reference to the attached drawings.

DESCRIPTION OF THE EMBODIMENTS

A detailed description will now be given of embodiments of the present invention with reference to the accompanying drawings.

First Embodiment

Figure 1:
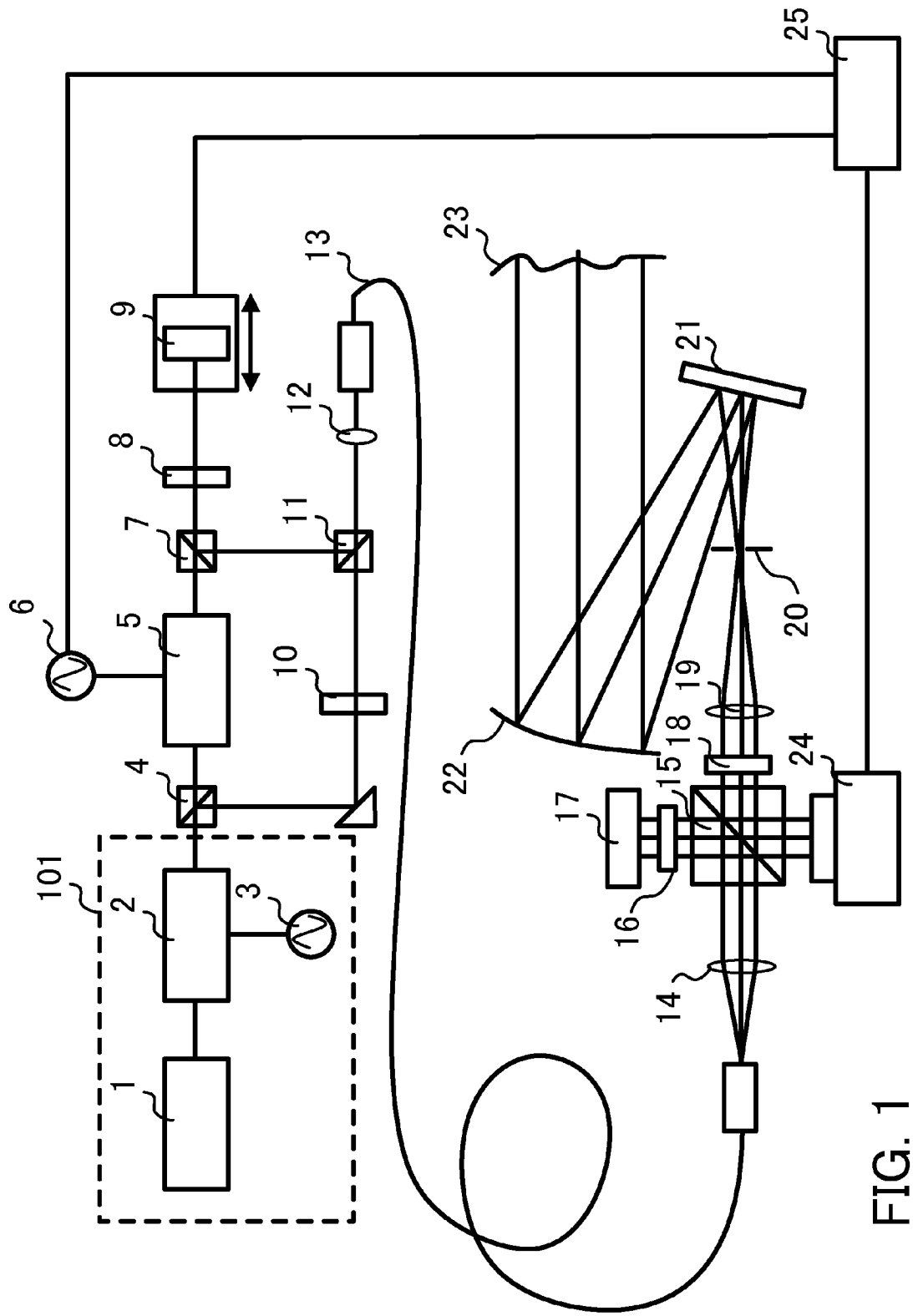
FIG. 1 is a block diagram of a measuring apparatus according to a first embodiment of the present invention.

FIG. 1 is a block diagram of a measuring apparatus according to a first embodiment. The measuring apparatus include a single optical frequency comb source 101, a polarization beam splitter ("PBS") 15 configured to split incident light into a test beam and a reference beam, a delay element 9 configured to delay the test beam and the reference beam, an image sensor 24 configured to capture an interference pattern, and an analyzer 25 configured to calculate a position of a test surface. The analyzer 25 is a controller configured to control an operation of each component in the measuring apparatus, and to execute calculation processing used to calculate the shape (position) of the test surface based upon the measurement result.

The optical frequency comb source 101 includes a distributed-feedback ("DFB") laser 1, an optical frequency comb generator ("OFCG") 2, and an oscillator 3, and emits an optical frequency comb. Unlike JP 3,739,987, a single optical frequency comb sources 101 restrains a cost increase of the measuring apparatus.

The DFB laser 1 is a DFB semiconductor laser having an oscillation wavelength of 1.5 μm, and is driven by a current driver (not illustrated). The DFB laser 1 is a single longitudinal mode laser having a linewidth of several MHz or lower at a central frequency $f_0$, which may apply an inexpensive laser element for optical communications. When an optical path difference between the test beam irradiated onto the test surface and the reference beam irradiated onto the reference surface is so long that the measurement errors caused by the wavelength stability of the DFB laser 1 are non-negligible, the gas absorption line and the etalon may be stabilized.

The beam emitted from the DFB laser 1 enters the OFCG 2. The OFCG 2 includes an electrooptical modulator in a Fabry-Perot resonator, and a lithium niobate waveguide type device is usable for a wavelength of 1.5 μm.

The OFCG 2 is modulated with a frequency of fm by the oscillator 3, and the free spectral range ("FSR") of the Fabry-Perot resonator is adjusted to an integral multiple of fm. As a result, the beam emitted from the OFCG 2 becomes an optical frequency comb having sidebands as a plurality of frequency components that are arranged at equal intervals of a frequency interval of fm on both sides of the frequency of $f_0$. The optical frequency comb has comb-shaped spectra arranged at equal frequency intervals in the frequency space, and becomes pulsed light having a repetition rate of the frequency interval of comb-shaped spectra. Herein, the frequency of fm of the oscillator 3 is 25 GHz, and the frequency interval of the optical frequency comb is also 25 GHz.

The beam emitted from the OFCG 2 is split into two beams having linearly polarized light components that are orthogonal to each other by the PBS 4. Hereinafter, a beam that transmits the PBS 4 will be referred to as a "reference beam" and a beam that is reflected by the PBS 4 will be referred to as a "test beam."

All frequency components in the optical frequency comb of the reference beam are equally shifted by the frequency of df by an acoustic optical modulator ("AOM") 5 modulated by an oscillator 6. The shift amount df of the frequency by the oscillator 6 is adjusted by the analyzer 25. The AOM 5 may serve as a frequency shifter configured to equally shift at least one of the frequency components of the reference beam and the test beam.

The beam emitted from the AOM 5 (frequency shifter) transmits a PBS 7, and is turned into circularly polarized light by a quarter waveplate ("QWP") 8, then is reflected by the delay element 9, is again turned into linearly polarized light by the QWP8, and is reflected by the PBSs 7 and 11.

The delay element (optical path difference changing element) 9 includes a linear stage in which a delay amount is highly precisely guaranteed by an encoder, etc., and a mirror provided on the linear stage. The delay element 9 is used for scanning with a delay time to the test beam and/or the reference beam. The delay element 9 changes the optical path difference between the reference beam and the test beam by an amount that is equal to or more than a synthetic wavelength obtained by dividing the light speed c by the frequency interval of fm of the optical frequency comb source but less than a measurement range that enables the height of the test surface 23 to be measured. The delay element 9 provides uniform (constant-speed) scanning in accordance with a command by the analyzer 25. A scan speed v and a scan amount ΔD will be described later.

The test beam is reflected by the PBS 4, deflected by a deflecting mirror by 90°, turned into polarized light in the orthogonal direction by a half waveplate ("HWP") 10, and multiplexed with the reference beam by the PBS 11.

The test and reference beams multiplexed by the PBS 11 are coupled in a polarization maintaining fiber ("PMF") 13 by a lens 12, and transmitted by the PMF 13. The polarizations of the test beam and the reference beam are adjusted so that they accord with the polarization mode of the PMF 13, and the orthogonal relationship is maintained between the polarizations of the test beam and the reference beam in the transmission.

The beam emitted from the PMF 13 is converted into a collimated beam by a collimator lens 14, and again split into the test beam and the reference beam by a PBS (beam splitter) 15.

The reference beam transmits through a QWP 16 after it is reflected by the PBS 15, is reflected by the reference surface 17, again transmits the QWP 16, and enters the image sensor 24.

The test beam transmits through the PBS 15 and a QWP18, and passes a condenser lens 19 and a deflecting mirror 21. Then, its beam diameter is magnified by a parabolic mirror 22, and the test beam illuminates the test surface 23 as a parallel beam. The scattered light from the test surface 23 passes the parabolic mirror 22, the deflecting mirror 21, the condenser lens 19, and the QWP 18, is reflected by the PBS 15, and enters the image sensor 24.

A aperture (diaphram) 20 is arranged at the focus position of the condenser lens 19, and part of the spatial frequency component of the scattered light from the test surface 23 is cut and utilized for the measurement. When the test surface 23 has a rough surface or its surface roughness is larger than the measuring wavelength, large speckles each having a size of 2λF/A occur on the image sensor 24. Herein, λ is a central wavelength of the optical frequency comb source 101, F is a focal length of the condenser lens 19, and A is a diameter of the aperture 20. In general, as the diameter of the aperture 20 becomes larger, a larger scattered light quantity can be received but the contrast of the (interference) signal of the interference pattern between the test beam and the reference beam reduces. For a diameter of the aperture 20 that handles both requirements, the pixel size of the image sensor 24 is set about ½ to 3 times as large as the speckle size.

The image sensor 24 is arranged at a position approximately conjugate with the test surface 23, and the interference between the test beam and the reference beam forms an interference pattern on the image sensor. The interference signal that is made by capturing or photoelectrically converting the interference pattern is output to the analyzer 25. The image capture timing by the image sensor 24 is controlled by the analyzer 25 and synchronized with scanning of the delay element 9. The interference signal obtained by the image sensor 24 is expressed by Expression 1. The analyzer 25 calculates the shape of the test surface 23 based upon the interference signal output from the image sensor 24:

$$I(x, y; t) = \sum_p I_p \cos\left(2\pi dft + 2\pi(f_0 + pf_m)\frac{2H(x, y) - 2D(t)}{c}\right) \quad \text{Expression 1}$$

Herein, p is a number of the frequency component of the optical frequency comb source 101, H is a position (shape) of the test surface 23, and D is a value by dividing an optical path difference between the test beam and the reference beam at the beam center, by two.

This embodiment captures the interference pattern through scanning with the delay element 9. A description will now be given of the relationship between the scan speed v and the scan amount ΔD of the delay element 9. When the optical path difference D becomes 0 at time t=0, the interference signal is expressed by Expression 2:

$$I(x, y; t) = \sum_p I_p \cos\left(2\pi\left(df - \frac{2v}{c}f_0\right)t + 2\pi p \cdot f_m \frac{2H(x, y) - 2vt}{c} + 2\pi f_0 \frac{2H(x, y)}{c}\right) \quad \text{Expression 2}$$

In the phase of the interference signal, the first term represents a beat frequency component, the second term represents an envelope component, and the third term represents a fixed phase component.

The scan speed v of the delay element 9 is determined by the first term in Expression 2. The phase scan amount per one image of the interference pattern needs a value equal to or smaller than about λ/4 so as to maintain the contrast of the interference pattern, and thus the scan speed v (or the absolute value of the beat frequency) needs to satisfy Expression 3 with the image pickup frequency fc:

$$\left|df - \frac{2v}{c}f_0\right| \le \frac{1}{4}f_c \quad \text{Expression 3}$$

Since no term of df exists in the white light interferometer, the scan speed v is restricted by the Doppler shift frequency (as the left second term in Expression 3). On the other hand, this embodiment reduces the beat frequency by setting a reverse code to the frequency shift by the AOM 5 and thus the delay element 9 can be more rapidly scanned than the prior art with the same image pickup frequency fc. It is thus effective to provide the AOM 5 to the white light interferometer.

The scan amount ΔD is determined by the second term in Expression 2. Since the second term depends upon the frequency component p, an envelope is formed with peaks at constructive interference positions for all frequency components. In the white light interferometer, a peak is located only at time H(x,y)−vt=0. In the optical frequency comb, due to the discrete frequencies, a peak appears similarly to a case where the optical path length difference is 0 when the optical path length difference is an integral multiple of 2π for each frequency interval of fm. As a result, the interference signal of the optical frequency comb becomes periodic for scanning with the delay element 9 and the period v·Δt is expressed by c/fm/2.

In order to detect the envelope peak of the interference signal, scanning of the optical path length of one period or longer by the delay element 9 is necessary. Since the phase calculating step, which will be described later, utilizes a Fourier transformation, the optical path difference needs to be an integral multiple of the period of the interference signal and the image pickup interval needs to be an integral division (or submultiple) of the optical path difference. Thus, the optical path difference ΔOP and the scan amount ΔD of the delay element 9 need to satisfy a condition of the Expression 4 with an integer M:

$$\Delta OP = 2\Delta D = M(2v \cdot \Delta t) = M \cdot \frac{c}{f_m} ( \equiv M \cdot \Lambda) \quad \text{Expression 4}$$

The white light interferometer requires the delay element to scan the entire measurement range on the test surface. On the other hand, this embodiment requires only the range determined by Expression 4 to be scanned, and thus realizes high-speed measurements. A wavelength obtained by dividing the light speed c by the frequency interval of fm will be referred to as a "synthetic wavelength Λ" hereinafter, and half of the synthetic wavelength Λ will be referred to as a signal period.

Figure 3:
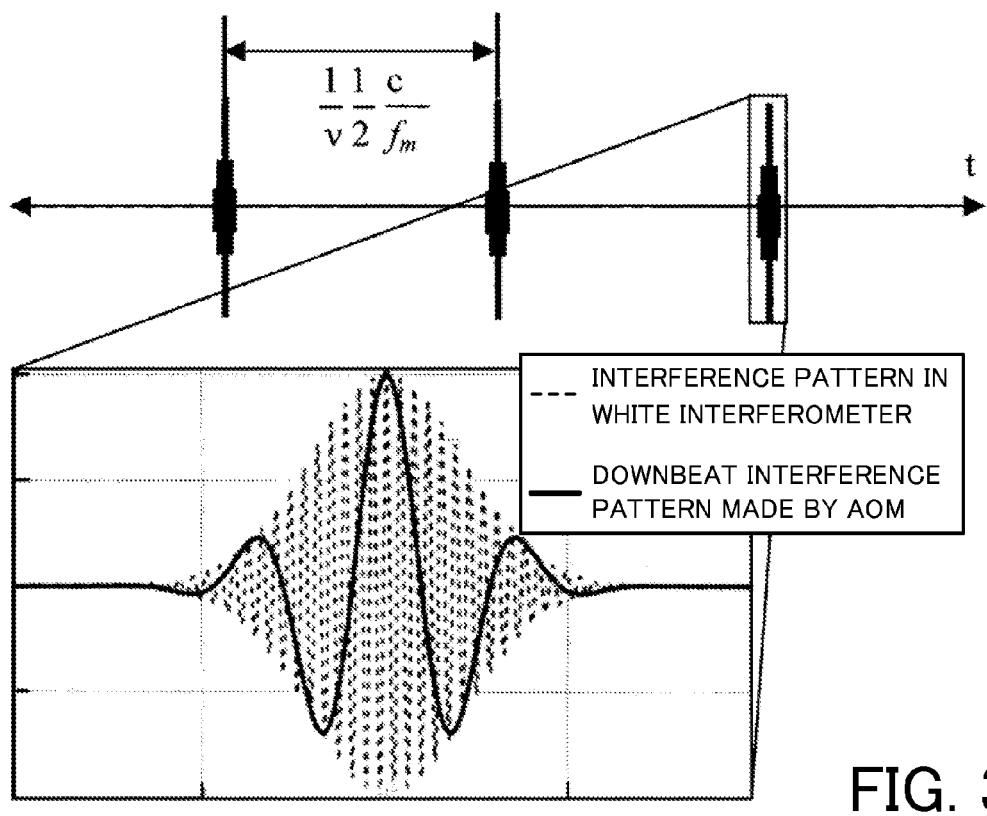
FIG. 3 illustrates a time waveform of an interference signal according to the first embodiment.

FIG. 3 is an interference signal of this embodiment. The time interval of the interference signal is expressed by c/(2vfm), and the beat frequency in the envelope is lower than that of the white light interference signal expressed by the dotted line.

While this embodiment can reduce the scan amount AD of the delay element 9 down to the signal period Λ/2, the position of the test surface 23 corresponding to the integer multiple of the signal period Λ/2 cannot be distinguished. More specifically, the position H(x,y) of the test surface 23 is expressed as a form that is made by multiplying a addition between the interference order N as an integer and the fraction phase ψ by the signal period as illustrated in Expression 5, but the interference order N is uncertain. The interference order N needs to be separately determined, and this procedure will be described later:

$$H(x, y) = \frac{\Lambda}{2}(N(x, y) + \psi(x, y)) \quad \text{Expression 5}$$

Figure 2:
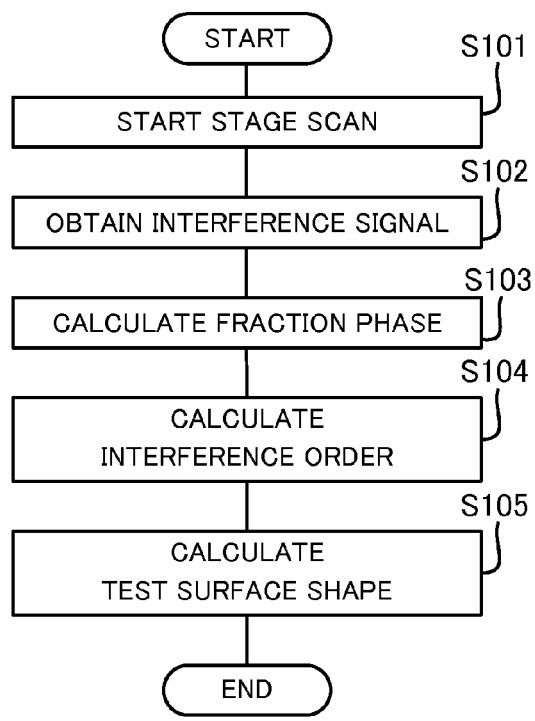
FIG. 2 is an operational flow of an analyzer illustrated in FIG. 1 according to the first embodiment.
Figure 6:
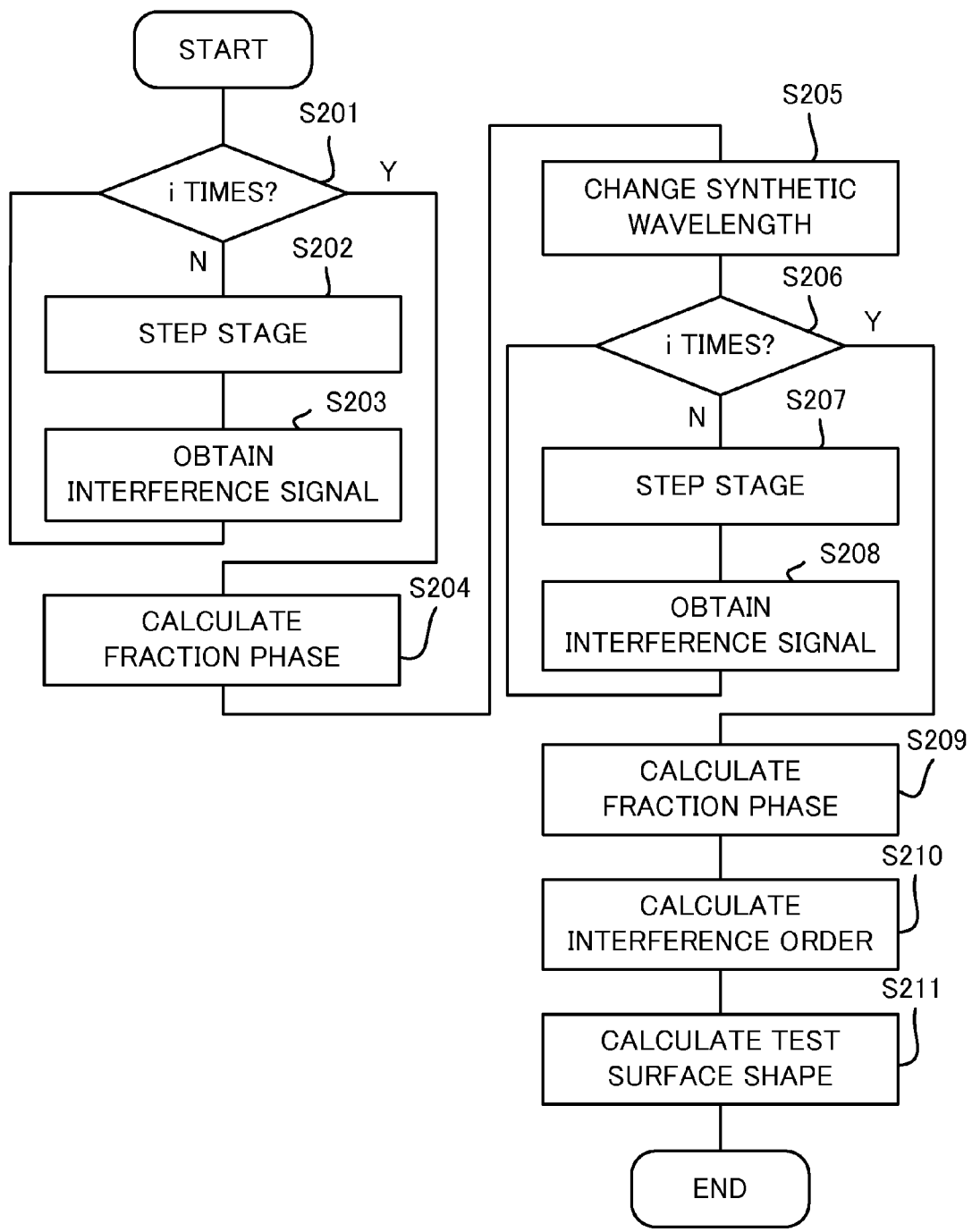
FIG. 6 is an operational flow of an analyzer illustrated in FIG. 5 according to a second embodiment.

FIG. 2 is a flowchart for explaining an operation of the analyzer 25. "S" stands for the step, and this is true of FIG. 6, which will be described later.

Initially, the analyzer 25 starts scanning utilizing the delay element 9 with a scan speed v and a delay amount AD corresponding to a signal period Λ/2 (S101), and obtains an interference signal form the image sensor 24 (S102).

Figure 4A:
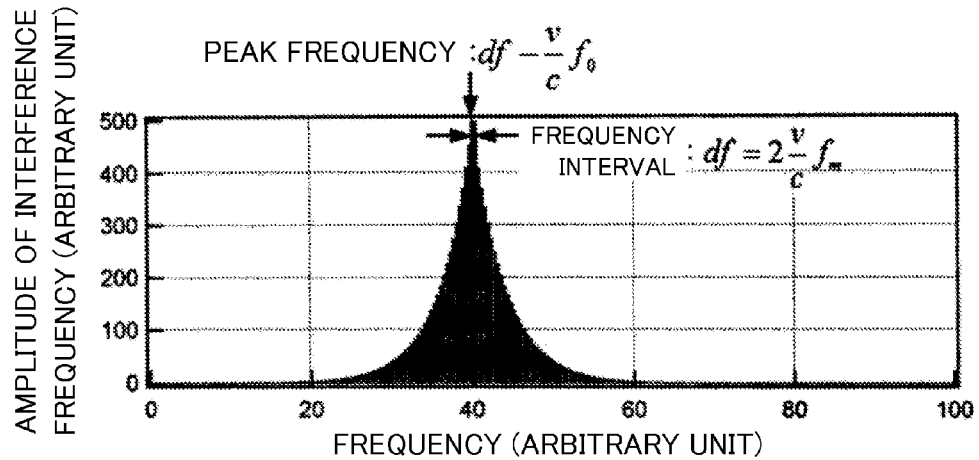
FIGS. 4A-4C illustrate frequency waveforms of the interference signal according to the first embodiment.

Next, the analyzer 25 calculates the fraction phase ψ (S103). The interference signal is expressed by Expression 2, and the frequency dependency of the phase can be calculated by Fourier-transforming Expression 2. FIG. 4A illustrates an amplitude of the Fourier-transformed interference signal. In FIG. 4A, the horizontal axis denotes a frequency (arbitrary unit), and the vertical axis denotes the amplitude of the frequency of the interference signal. There is a peak at a central frequency df−(v/c)·f₀. The frequency interval Δf is expressed by Expression 6 with the scan amount ΔD=Λ/2:

$$\Delta f = 2\frac{v}{c}f_m \quad \text{Expression 6}$$

Figure 4B:
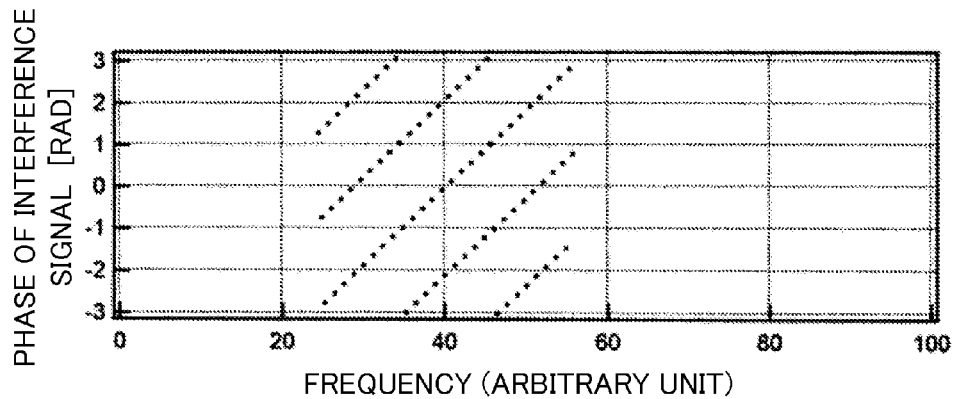
Figure 4C:
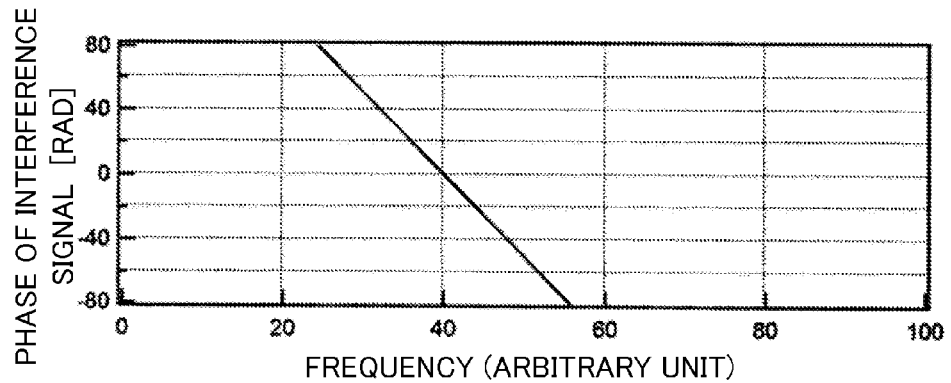

The phase of the Fourier-transformed frequency component accords with the phase of the optical frequency comb for each frequency component. The phase for each frequency component calculated by the Fourier transformation is wrapped as illustrated in FIG. 4B, and the phase illustrated in FIG. 4C is obtained by the one-dimensionally phase connection in the frequency direction. The horizontal axis in each of FIGS. 4B and 4C is a frequency (arbitrary unit), and the ordinate axis denotes a phase (radian) of the interference signal.

Since the fraction phase ψ corresponds to the phase difference of the interference signal for each frequency interval of fm, it can be calculated from the phase slope in FIG. 4C. More specifically, the analyzer 25 calculates the fraction phase ψ by utilizing the regression line or the average value. In general, the frequency components of the optical frequency comb are not uniform, and the phase detecting precision depends upon the light quantity. Therefore, it may be weighted with the frequency amplitude. The synthetic wavelength phase ψ may be calculated over the entire test surface.

Next, the analyzer 25 can calculate the interference order N through a phase connection (S104). When the step at the position H of the test surface 23 is smaller than the signal frequency and the phase change between the adjacent pixels of the image sensor 24 is smaller than 0.5, a distribution of the interference order N can be determined through a two-dimensional phase connection that is universally used for the optical surface shape inspections.

When the test surface is a rough surface, speckles occur. The phase measuring precision lowers in the speckle dark part, because the interference signal intensity and thus the SN ratio lower and the speckles varying according to wavelengths cause phase errors. In measuring a rough surface, the speckle intensity and the interference signal contrast may be used for weighting in the phase connection so as to prevent phase connection errors due to the low accuracy phase measurement result. Alternatively, the phase measurement in S103 may adopt thresholds for the speckle intensity and the contrast, and may eliminate as a void a pixel that does not satisfy the condition.

Next, the analyzer 25 calculates the shape (position) of the test surface (target surface) 23 utilizing Expression 5 with the fraction phase ψ calculated in S103 and the interference order N calculated in S104 (S105), and ends the measurement.

This embodiment realizes a high-speed measuring apparatus by reducing the scan amount ΔD of the delay element 9 utilizing the optical frequency comb, and by reducing the Doppler shift by the delay element 9 utilizing the frequency shift. A single optical frequency comb can realize an inexpensive and highly precise measuring apparatus because there are no relative phase noises.

Second Embodiment

Figure 5:
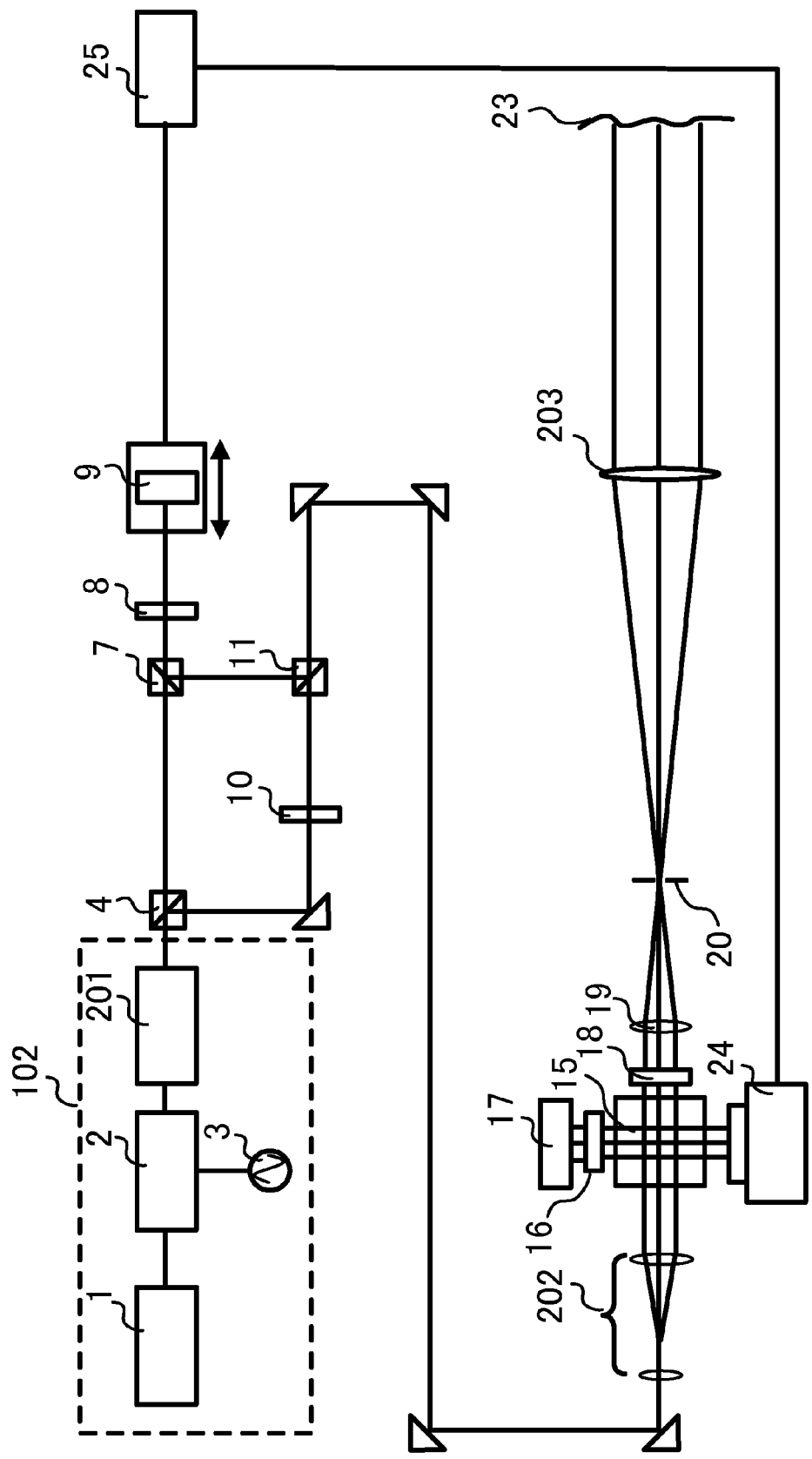
FIG. 5 is a block diagram of a measuring apparatus according to a second embodiment of the present invention.

FIG. 5 is a block diagram of a measuring apparatus according to a second embodiment. The measuring apparatus of this embodiment is different from that of the first embodiment in that the optical frequency comb source 102 includes an etalon 201 configured to widen the frequency interval and the delay element 9 stops in the image pickup. Those elements in FIG. 5, which are the corresponding elements in FIG. 1, will be designated by the same reference numerals.

The optical frequency comb source 102 is made by attaching the etalon 201 to the OFCG 2 in the optical frequency comb source 101. A single optical frequency comb source 102 is provided.

The elements up to the OFCG 2 are similar to those of the first embodiment, and the optical frequency comb with a central frequency of $f_0$ and the frequency interval of fm is emitted from the OFCG 2 and enters the etalon 201. The etalon 201 has FSR that is integer N times as many as fm, and the transmission spectrum of the etalon 201 is adjusted to the emission spectrum of the OFCG 2.

The frequency interval of the optical frequency comb that has transmitted the etalon 201 can be set to N·fm by making the resolution of the etalon 201 sufficiently smaller than fm. In this embodiment, fm of the OFCG 2 is 25 GHz, but the frequency interval can be extended to 250 GHz by designing the etalon 201 that can set 10 to N. As a result, the synthetic wavelength is reduced to 1.2 mm, a variation amount of the delay element 9 is reduced to 0.6 mm, and the measurement becomes faster.

A mode-locked laser is known as an optical frequency comb source other than the optical frequency comb generator. A frequency interval of a general mode-locked laser is about 100 MHz and the synthetic wavelength is long. When the etalon is used as in this embodiment, the synthetic wavelength can be made shorter. When the light power loss of the etalon is problematic, the light that has transmitted the etalon 201 may be amplified by an optical amplifier, such as an erbium doped fiber amplifier ("EDFA") and a semiconductor optical amplifier ("SOA").

The optical frequency comb from the optical frequency comb source 102 is split into the test beam and the reference beam by the PBS 4, and the reference beam is delayed by the delay element 9, similar to the first embodiment. The (delay) optical path of the reference beam is similar to that of the first embodiment except that the AOM 5 is omitted.

The test beam and the reference beam multiplexed by the PBS 11 are spatially transmitted by the deflecting mirrors, and their beam diameters are enlarged by a beam expander 202. The interference optical system subsequent to the PBS 15 is similar to that of the first embodiment in which the deflecting mirror 21 and the parabolic mirror 22 are changed to a collimator lens 203.

The image sensor 24 captures an interference pattern between the test beam and the reference beam and outputs an interference signal. The analyzer 25 calculates the shape (position) of the test surface 23 from the change of the interference signal obtained by driving the delay element 9.

FIG. 2 is a flowchart for explaining an operation of the analyzer 25.

Initially, the analyzer 25 steps the delay element 9 (S201, S202). The step amount δD of the delay element 9 is set so as to satisfy Expression 7 with integers $N_1$ and $N_2$. When the $N_1$ is set to 1 or more, the step amount δD can be maintained wider than the central wavelength of the optical frequency comb source 102 and the measurement becomes faster than the conventional white light interferometer. In addition, no scanning does not cause the contrast of the interference signal to lower.

$$\delta D = \frac{1}{2}\frac{c}{f_0}\left(N_1 + \frac{1}{N_2}\right) \quad \text{Expression 7}$$

Next, the analyzer 25 confirms that the delay element 9 stands still and then obtains the interference signal (S203). The interference signal for the delay element position $D_i$ in the i-th measurement loop is expressed by Expression 8:

$$\begin{aligned}I(x, y; D_i) &= \sum_p I_p \cos\left(2\pi f_0 \frac{2H(x, y) - 2D_i}{c} + 2\pi p \cdot f_m \frac{2H(x, y) - 2D_i}{c}\right) \\ &= \sum_p I_p \cos\left(2\pi f_0 \frac{2H(x, y)}{c} - 2\pi N_1 i - 2\pi \frac{i}{N_2} + 2\pi p \cdot f_m \frac{2H(x, y) - 2D_i}{c}\right)\end{aligned} \quad \text{Expression 8}$$

The first term is a phase constant term and the second term is an integral multiple of 2π in Expression 8 and these terms are negligible. The third term is a carrier frequency component and a fourth term is an envelope component.

The analyzer 25 returns to S201 when it obtains the interference signal, and S202 and S203 are repeated until the driving amount of the delay element 9 reaches ΔD.

Next, the analyzer 25 calculates the fraction phase ψ from the change to the delay amount of the interference signal (S204). The spectra similar to FIGS. 4A and 4B of the first embodiment are obtained by Fourier-transforming the changes of the interference signal to the measurement loop for each pixel of the image sensor 24. The frequency at the envelope peak is $N_i$ determined by the step amount δD. The fraction phase ψ may be calculated by the same approach as that of the first embodiment.

Next, the analyzer 25 turns the synthetic wavelength (synthesized wavelength) Λ of the optical frequency comb source 102 into Λ' by changing the frequency of the oscillator 3 (S205), repeats steps similar to S201 to S205, and calculates the fraction phase ψ' for the synthetic wavelength Λ' (S206 to S209).

Next, the analyzer 25 calculates the interference order N (S210). A synthetic wavelength $Λ_S$ between the two different synthetic wavelengths Λ and Λ' is expressed by Expression 9. When the difference between the synthetic wavelengths Λ and Λ ' is small, Λs>>Λ may be established. It is settled that the interference order for Λs becomes 0 by setting Λs/2 larger than the measurement range:

$$\Lambda_S = \frac{\Lambda \Lambda'}{|\Lambda - \Lambda'|} \quad \text{Expression 9}$$

The position H of the test surface is expressed by Expression 10 with the synthetic wavelengths $\Lambda_S$ and $\Lambda'$:

$$H(x, y) = \frac{\Lambda_S}{2}(\psi'(x, y) - \psi(x, y)) = \frac{\Lambda}{2}(N(x, y) - \psi(x, y)) \quad \text{Expression 10}$$

The interference order is calculated by Expression 11:

$$N(x, y) = \text{round}\left(\frac{\Lambda'}{|\Lambda' - \Lambda|}(\psi'(x, y) - \psi(x, y)) - \psi(x, y)\right) \quad \text{Expression 11}$$

The interference order may be determined by generating a plurality of synthetic wavelengths when it is difficult to generate the synthetic wavelength equal to or higher than the measurement range through one change of the synthetic wavelength due to the measuring accuracy of the fraction phase.

The analyzer 25 calculates the shape of the test surface (target surface) based upon the fraction phase and the interference order (S211), and ends the measurement.

This embodiment can inexpensively realize a high-speed and highly precise measuring apparatus because this embodiment thins the optical frequency comb using the frequency filter and further reduces a scan amount of the delay element 9. In addition, this embodiment reduces the scan interval using the stepping operation and consequently reduces the number of measurements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-200097, filed Sep. 14, 2011 which is hereby incorporated by reference herein in its entirety.

What is claimed is:

1. A measuring apparatus comprising:
an optical frequency comb source configured to emit an optical frequency comb in which a plurality of frequency components are arranged at equal frequency intervals;
a beam splitter configured to split a beam emitted from the optical frequency comb source into a test beam to be irradiated onto a test surface and a reference beam to be irradiated onto a reference surface;
an optical path difference changing element configured to change an optical path difference between the reference beam and the test beam;
an image sensor configured to capture an interference pattern formed by interference between the test beam and the reference beam; and
an analyzer configured to calculate a position of the test surface based upon a signal of the interference pattern captured while the optical path difference is being changed by the optical path difference changing element,
wherein the analyzer calculates the position of the test surface by utilizing the following expression:

$$H(x, y) = \frac{\Lambda}{2}(N(x, y) + \psi(x, y))$$

where H(x,y) is the position of the test surface, $\Lambda$ is a synthetic wavelength obtained by dividing a light speed by the frequency interval of the optical frequency comb source, N(x,y) is an interference order, and $\psi(x,y)$ is a fraction phase corresponding to a phase difference of the signal of the interference pattern for each frequency interval, and
wherein the analyzer determines the interference order by a phase connection of the fraction phase.

2. The measuring apparatus according to claim 1, wherein the analyzer obtains the signal of the interference pattern from the image sensor whenever the optical path difference is changed by an integral division of a synthetic wavelength obtained by dividing a light speed by the frequency interval of the optical frequency comb source.

3. A measuring apparatus comprising:
an optical frequency comb source configured to emit an optical frequency comb in which a plurality of frequency components are arranged at equal frequency intervals;
a beam splitter configured to split a beam emitted from the optical frequency comb source into a test beam to be irradiated onto a test surface and a reference beam to be irradiated onto a reference surface;
an optical path difference changing element configured to change an optical path difference between the reference beam and the test beam;
an image sensor configured to capture an interference pattern formed by interference between the test beam and the reference beam; and
an analyzer configured to calculate a position of the test surface based upon a signal of the interference pattern captured while the optical path difference is being changed by the optical path difference changing element, wherein the analyzer calculates the position of the test surface by utilizing the following expression:

$$H(x, y) = \frac{\Lambda}{2}(N(x, y) + \psi(x, y))$$

where H(x,y) is the position of the test surface, $\Lambda$ is a synthetic wavelength obtained by dividing a light speed by the frequency interval of the optical frequency comb source, N(x,y) is an interference order, and $\psi(x,y)$ is a fraction phase corresponding to a phase difference of the signal of the interference pattern for each frequency interval, and
wherein the analyzer determines the interference order by utilizing the following expression and fraction phases $\psi(x,y)$ and $\psi'(x,y)$ corresponding to two different synthetic wavelengths $\Lambda$ and $\Lambda'$:

$$N(x, y) = \text{round}\left(\frac{\Lambda'}{|\Lambda' - \Lambda|}(\psi'(x, y) - \psi(x, y)) - \psi(x, y)\right).$$

4. The measuring apparatus according to claim 1, wherein the optical frequency comb source includes an etalon configured to widen the frequency interval of the optical frequency comb by an integral multiple.

5. The measuring apparatus according to claim 3, wherein the analyzer obtains the signal of the interference pattern from the image sensor whenever the optical path difference is changed by an integral division of a synthetic wavelength obtained by dividing a light speed by the frequency interval of the optical frequency comb source.

6. The measuring apparatus according to claim 3, wherein the optical frequency comb source includes an etalon configured to widen the frequency interval of the optical frequency comb by an integral multiple.

* * * * *